United States Patent [19]

Hausermann

[11] 4,376,355

[45] Mar. 15, 1983

[54] ABRADING APPARATUS HAVING ZERO REFERENCE SENSING MEANS

[75] Inventor: Marten C. Hausermann, Addison, Ill.

[73] Assignee: Hausermann Abrading Process Company, Du Page County, Ill.

[21] Appl. No.: 256,382

[22] Filed: Apr. 22, 1981

[51] Int. Cl.³ .............................................. B24B 19/00
[52] U.S. Cl. ........................................ 51/58; 51/157; 51/165.75; 51/165.77; 51/165.92; 219/69 S
[58] Field of Search .................. 51/58, 165 R, 165.77, 51/165.75, 165.74, 165.92, 157; 219/69 S, 69 V

[56] References Cited

U.S. PATENT DOCUMENTS

| | | | |
|---|---|---|---|
| 2,947,121 | 8/1960 | Coes | 51/134.5 R |
| 3,494,079 | 2/1970 | Klein | 51/165 R |
| 3,748,427 | 7/1973 | Baldwin | 219/69 S |
| 3,905,161 | 9/1975 | Tomita et al. | 51/165.77 |
| 4,186,527 | 2/1980 | Hausermann et al. | 51/58 |

Primary Examiner—Harold D. Whitehead
Attorney, Agent, or Firm—Robert F. Van Epps

[57] ABSTRACT

An abrading apparatus for shaping electric discharge machining electrodes wherein an abrading die is provided with a thin coating of electrically conductive material. The conductive coating and the electrode workpiece are electrically coupled to a switching means to provide a zero reference output signal when the die and workpiece are first driven into contact with one another.

4 Claims, 4 Drawing Figures

ABRADING APPARATUS HAVING ZERO REFERENCE SENSING MEANS

BACKGROUND OF THE INVENTION

1. Field of the Invention

The present invention relates generally to the field of electric discharge machining and more particularly to an improvement in apparatus for abrasively forming EDM electrodes wherein means are provided for sensing the initial contact between the abrading die and electrode workpiece.

2. Description of the Prior Art

Prior to the present invention a method and apparatus for forming EDM electrodes were disclosed in U.S. Pat. Nos. 3,663,785 entitled Method of Erosively Shaping a Master Die and U.S. Pat. No. Re. 27,588 entitled Apparatus for Shaping Electrodes, respectively. An improved apparatus was described in U.S. Pat. No. 4,186,527 which issued on Feb. 5, 1980.

The basic method and apparatus for its implementation involve the use of an abrasive die and an electrode workpiece mounted in working alignment with one another. The die and workpiece are moved relative to one another in a horizontal oscillatory rotary motion as they are brought together in the vertical direction such that the workpiece is abrasively formed into the same shape and contour as the die. The later patent describes an improvement wherein the relative vertical motion of the die and workpiece is automatically controlled as a function of the relative vertical position thereof.

Even with the improved vertical motion control arrangement it remains necessary to initially position the die with respect to the workpiece in the vertical dimension. Prior to the present invention this initial positioning was accomplished manually. The operator would cause the vertically movable platen to infeed until he visually determined that the die and workpiece came into physical contact. The platen would then be caused to outfeed a preselected distance and the cyclic vertical motion initiated after which it would be controlled automatically.

The visual determination of initial contact between the die and workpiece has been found by the applicant to be imprecise at best, being of variable accuracy from operator to operator. As a result, the otherwise high degree of accuracy obtainable with the automatic control arrangement was impaired through initial set-up errors. The same problem existed in the initial set-up of the earlier timer controlled abrading machines.

One potential solution to the set-up problem was to use a pressure sensing device to indicate contact, however, mounting such a sensor in a manner that will not interfere with the abrading process and yet compatible with a high level vibration environment is complex and expensive.

OBJECTS AND SUMMARY OF THE INVENTION

From the preceding discussion, it will be understood that among the various objectives of the present invention are included the following:

the provision of a new and improved apparatus for abrasively forming electric discharge machine electrodes;

the provision of apparatus of the above-described character wherein means are included for automatically sensing initial contact between the die and workpiece; and the provision of apparatus of the above-described character wherein the contact sensor does not interfere with the abrasion process.

These as well as other objectives of the present invention are achieved by providing the abrading die with a thin coating of electrically conductive material and electrically coupling the coating and the electrode workpiece to a switching means to thereby provide an output signal when the die and workpiece are first driven into contact with one another. Since only the initial contact is required to be sensed the conductive coating may be destroyed by the subsequent abrading process without detrimental effect. The die is simply re-coated prior to its next use.

The forgoing as well as other objects, features and advantages of the present invention will become more apparent from the following detailed description taken in conjunction with the various views of the appended drawings.

DESCRIPTION OF PREFERRED EMBODIMENT

Figure 1:
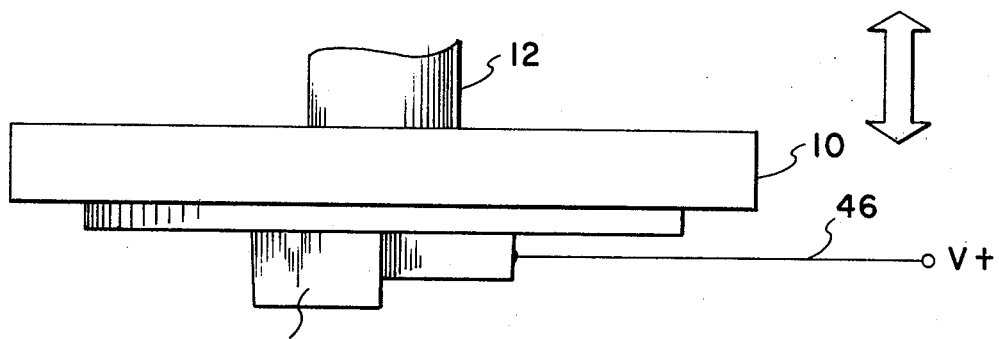
FIG. 1 is a simplified partial elevation view of the relevant portions of an electrode abrading machine improved in accordance with the principles of the present invention.

Turning now to FIG. 1 there is shown a simplified elevation view of those portions of an electrode abrading machine improved in accordance with the present invention. Only those portions of the machine which provide the immediate environment for the present invention are shown. For a more detailed description of the complete abrading apparatus reference may be had to U.S. Pat. No. Re 27, 588. The improvement of the present invention resides in the means for sensing initial contact between the die and workpiece. The abrading apparatus itself will be described herein only insofar as is necessary to describe the improvement.

An upper platen 10 is vertically movable by a ram 12 with respect to a lower platen or table 14 along supports (not shown). The table 14 is adapted to be driven in a horizontal oscillatory rotary motion via spindles 16 and 18 (shown only in part) with respect to the upper platen 10.

An abrading die 20 is affixed to the upper platen 10 and an electrode workpiece 22 is disposed on table 14. The vertical motion during the abrading process is progressively downwardly and cyclic as is more fully described in U.S. Pat. No. 4,186,527 referred to above. During the outfeed portion of each abrading cycle a solvent is delivered from a supply tank 24 by pump 26 to the electrode workpiece 22 via tube 28. The abraded particles are thus flushed from the workpiece 22 by the solvent and returned to the supply tank 24 via tube 30. The solvent is reused after filtration of the particles. A settling tank type of filtration arrangement is illustrated wherein the electrode workpiece particles 32 settle out by gravity while the solvent overflows a baffle 34 in the supply tank 24 to be reused.

The electrode workpiece 22 is, of course, itself electrically conductive, however, the abrading die may or may not be formed of a conductive material. In at least one embodiment of the basic abrading apparatus the die is formed of the thermosetting epoxy material mixed with an abrasive material. Being non-conductive the epoxy abrading die is provided with a coating 36 of electrically conductive material as illustrated in FIGS. 2A–2C.

One or the other of the abrading die 20 or electrode workpiece 22 is coupled to a voltage source, V+, and the other through a relay coil 38 to ground potential. When the die 20 is driven into contact with the workpiece 22 the circuit is completed, energizing relay coil 38 and closing contacts 40 to thereby indicate contact. It will be apparent that alternate switching means such as solid state devices could be substituted for the relay 38. The contact indication may in turn be introduced into an automatic control system 41 as described in U.S. Pat. No. 4,186,527 and used to stop the vertical motion prior to entry of the various dimensions for automatic operation into the control system. Alternatively, the contact indication could be used to operate an indicator on non-automated apparatus to permit an operator to stop the movement before adjusting timer controls.

The applicant has found that a particularly useful electrically conductive material which may be used to coat the die member is the slurry formed by the particles 32 filtered from the flushing solvent, however, other coating materials will occur to those skilled in the art. After initial contact the slurry readily wears away during the abrading process and is, of course, physically and chemically compatible with the flushing system and solvent.

Figure 2A:
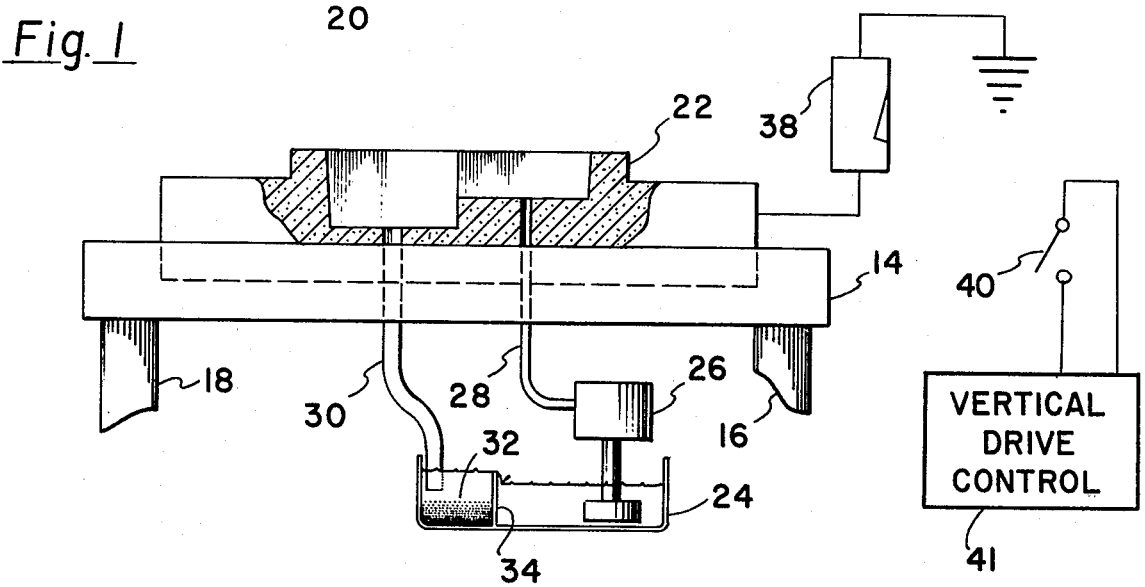
FIGS. 2A through 2C are cross section views of an abrading die illustrating the electrically conductive coating at progressive stages of the abrading process.
Figure 2A:
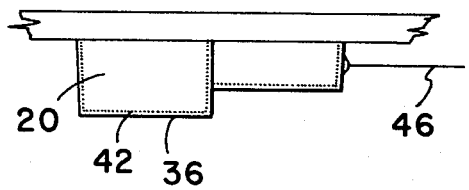
Figure 2B:
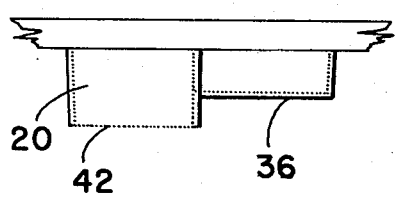
Figure 2C:
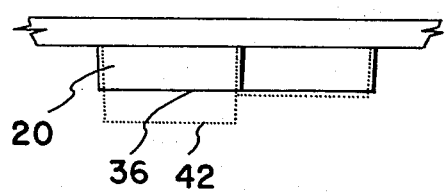

With reference now to FIGS. 2A–2C there is shown in cross-section the coated abrading die in progressive stages of the abrading process. In FIG. 2A the die 20 has its abrasive surface 42 coated with the electrically conductive material 36 and an electrical contact 46 is fixed to the coating 36. FIG. 2B illustrates the die 20 after the initial cycle of the abrading process and shows the coating 36 to have been worn from the abrasive surface making initial contact with the workpiece. FIG. 2C shows the coating 36 as it continues to be worn away from the abrasive surface 42 as the abrading process continues.

From the foregoing discussion it will be understood that the applicant has proviced a new and improved apparatus for shaping EDM electrodes whereby the objectives set forth hereinabove are efficiently achieved. Since certain changes in the above-described construction will occur to those skilled in the art without departure from the scope of the invention, it is intended that all matter set forth in the preceding description or shown in the appended drawings shall be interpreted as illustrative and not in a limiting sense.

Having described what is new and novel and desired to secure by Letters Patent, what is claimed is:

1. An improved apparatus for forming electrical discharge machining electrodes said apparatus being of the type including a first platen, a second platen mounted in superimposed relation and adapted to be driven vertically with respect to said first platen, a die member having an abrasive surface mounted on one of said platens, a workpiece member mounted on the platen opposite the platen on which said die member is mounted in working alignment with said die member, means for applying horizontal oscillatory rotary motion to said first platen, vertical drive means for infeeding said workpiece member and said die member into contact with each other while said oscillatory rotary motion is being applied to thereby abrasively shape said workpiece member to the form of said die member, and wherein said improvement comprises an electrically conductive coating disposed over at least a lower portion of said abrading die;

a source of electric potential coupled to one of said electrode workpiece and said electrically conductive coating; and switching means coupled to the other of said electrode workpiece and said electrically conductive coating, whereby when said coated abrading die is first driven into contact with said electrode workpiece said electric potential is coupled to and operates said switching means to thereby indicate said contact.

2. Apparatus as recited in claim 1 further including means for applying a solvent to said electrode workpiece to flush particles of abraded workpiece material from said workpiece;

means for collecting said solvent and workpiece particles and for substantially separating one from the other; and wherein said electrically conductive coating comprises a slurry formed by said particles.

3. Apparatus as recited in claim 1 further including means for controlling the operation of said vertical drive means; and said switching means is coupled to said vertical drive controlling means such that operation of said switching means interrupts operation of said vertical drive means.

4. Apparatus as recited in claim 1 wherein said switching means comprises a relay having a coil coupled between one of said electrode workpiece and said electrically conductive coating and ground potential.

* * * * *